(12) United States Patent
Agulhon

(10) Patent No.: US 6,912,543 B2
(45) Date of Patent: Jun. 28, 2005

(54) OBJECT-ORIENTED METHOD AND SYSTEM FOR TRANSFERRING A FILE SYSTEM

(75) Inventor: Isabelle Agulhon, Nice (FR)

(73) Assignee: International Business Machines Corporation, Armonk, NY (US)

(*) Notice: Subject to any disclaimer, the term of this patent is extended or adjusted under 35 U.S.C. 154(b) by 324 days.

(21) Appl. No.: 09/992,103

(22) Filed: Nov. 5, 2001

(65) Prior Publication Data

US 2002/0078065 A1 Jun. 20, 2002

(30) Foreign Application Priority Data

Nov. 14, 2000 (EP) .............................. 00480103

(51) Int. Cl.[7] .............................. G06F 17/00
(52) U.S. Cl. .................. 707/103 X; 707/103 Y; 707/103 R
(58) Field of Search ................ 707/103 R, 103, 707/103 Y, 200, 203, 204; 709/238, 231, 232

(56) References Cited

U.S. PATENT DOCUMENTS

| | | | | |
|---|---|---|---|---|
| 5,495,607 A | * | 2/1996 | Pisello et al. ............. 707/10 |
| 5,706,457 A | * | 1/1998 | Dwyer et al. ............. 345/835 |
| 6,108,707 A | * | 8/2000 | Wiese ..................... 709/231 |
| 2002/0133491 A1 | * | 9/2002 | Sim et al. ................ 707/10 |
| 2003/0084056 A1 | * | 5/2003 | DeAnna et al. .......... 707/100 |
| 2003/0177422 A1 | * | 9/2003 | Tararoukhine et al. ..... 714/48 |
| 2004/0015960 A1 | * | 1/2004 | Wanchoo et al. ......... 717/178 |

OTHER PUBLICATIONS

Bukhres et al, "Effective standards for metadata in the GCMD data access system", IEEE 2000, pp. 155–161.*

* cited by examiner

Primary Examiner—Uyen Le
(74) Attorney, Agent, or Firm—William A. Kinnaman, Jr.

(57) ABSTRACT

An object-oriented method and system for transferring a file system including folders and data files from a source data storage controlled by a source data processing unit to a destination data storage controlled by a destination data processing unit over a transfer medium. This method consists in building in the source data storage at least one file object containing the data package to be transferred, generating a descriptor file including the parameters associated with the file object, generating an archive file including the data package, and transmitting the descriptor file and the archive file from the source data processing unit to the destination data processing unit over the transfer medium.

14 Claims, 4 Drawing Sheets

OBJECT-ORIENTED METHOD AND SYSTEM FOR TRANSFERRING A FILE SYSTEM

BACKGROUND OF THE INVENTION

1. Field of the Invention

The present invention relates generally to the transfer of data files between two servers over any transfer medium and relates in particular to an object-oriented method and system for transferring a file system from a source data storage in source data processing to a destination data storage in a destination data processing unit.

2. Description of the Related Art

With the growth in data file transfers over data transmission networks such as Internet and the increasing amount of data which is stored in the data storage of the data processing units under the form of file systems, the transfer of data files over a transfer medium has raised more and more problems. Thus, it is current today to have to transfer a complex directory structure composed of more than 200 subdirectories with a depth greater than 5 levels and including more than 1000 files that represent a volume of data greater than 1 gigabit.

When transferring data files over an IP network, a known solution consists in using the File Transfer Protocol (FTP). But, this protocol requires one to generate a directory identical to the origin directory in the destination equipment. Unfortunately, many tools based upon FTP do not automatically create a directory structure. Furthermore, with a complex file system containing many files representing a very important volume of data, checking the data integrity is not easy and requires an important processing time.

Always when transferring the files over the IP network, a partial solution to the above problem is to use a specific tool such as Softdist or Tivoli. Such tools use a proprietary code-packaging method to generate code blocks only readable and usable by themselves. This tool solves the problem of data integrity but it remains a drawback that it is a proprietary method which depends entirely on the operating system of the destination server. Furthermore, since the code blocks generated by the tool are only readable by themselves, it is not possible to know the contents of these code-blocks.

In order to be able to transfer data files over any kind of connection and not only a network, installer tools have been developed. Unfortunately, such tools are not adapted for transferring important system files. As for the Tivoli tools, they depend on the operating system of the destination server. Furthermore, as these tools create auto-extractable files, it is not possible to know the contents of such auto-extractable files.

SUMMARY OF THE INVENTION

Accordingly, a main object of the invention is to achieve a method and system for transferring file systems over any kind of transfer medium between a source data processing unit and a destination data processing unit.

Another object of the invention is to achieve a method and system for transferring a file system between a source data processing unit and a destination processing unit wherein the user keeps an easy knowledge and understanding of the file structure being transferred.

The invention relates therefore to an object-oriented method and system for transferring a file system including folders and data files from a source data storage controlled by a source data processing unit to a destination data storage controlled by a destination data processing unit over a transfer medium. The method consists in building in the source data storage at least one file object containing the data package to be transferred, generating a descriptor file including the parameters associated with the file object, generating an archive file including the data package, and transmitting the descriptor file and the archive file from the source data processing unit to the destination data processing unit over the transfer medium.

According to an important feature of the invention, the file object is built by using a file transfer tool model including: (1) a header containing the following functions: set directory name, get environment, set environment, create, and install data; and (2) a body containing the following items: directory name, installed directory, size, version, and data package.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
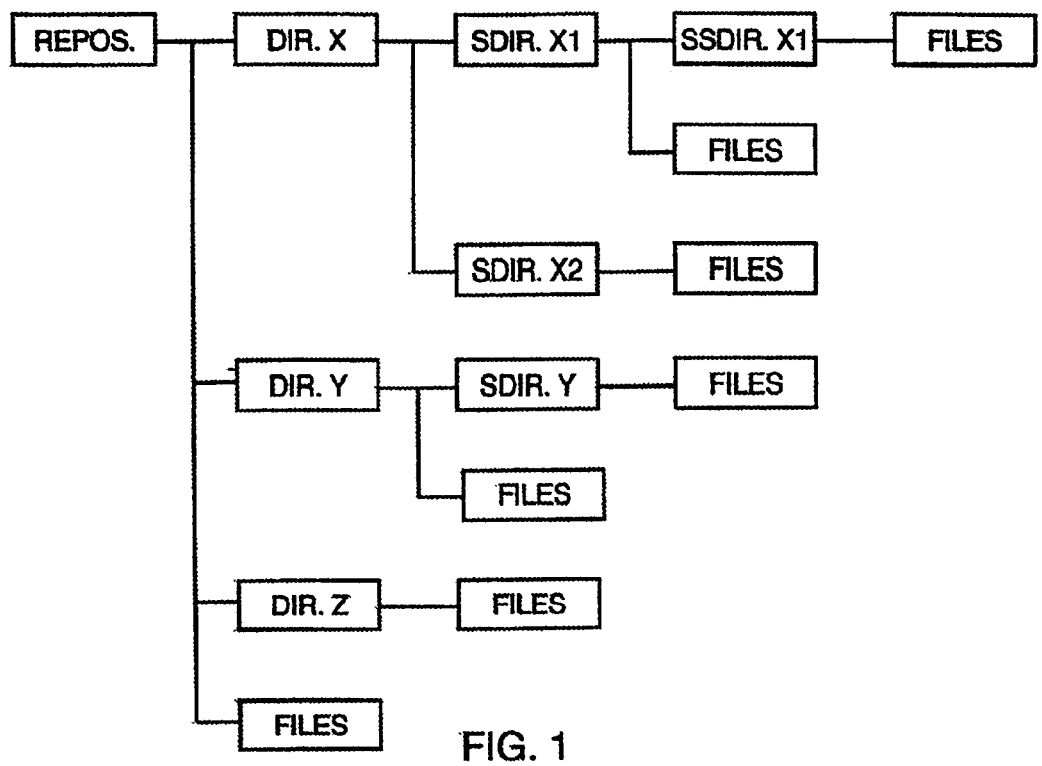
FIG. 1 represents a file system including folders and files to be transferred according to the method of the invention.

A file system to be transferred according to the method of the invention includes directories, or folders, and files as shown in FIG. 1. Such a file system is represented as a tree beginning with one and only one root directory called a repository (REPOS). The repository includes a plurality of directories such as DIR.X, DIR.Y, DIR.Z and can be itself the directory of files directly attached thereto. Each directory can be divided into a plurality of subdirectories such as SDIR.X or SDIR.Y and so on, and each folder such as DIR.Z or SDIR.X can be the directory of files directly attached thereto. The tree depth (the number of folder levels) depends upon the operating system of the source data processing unit in which are stored the files.

Figure 2:
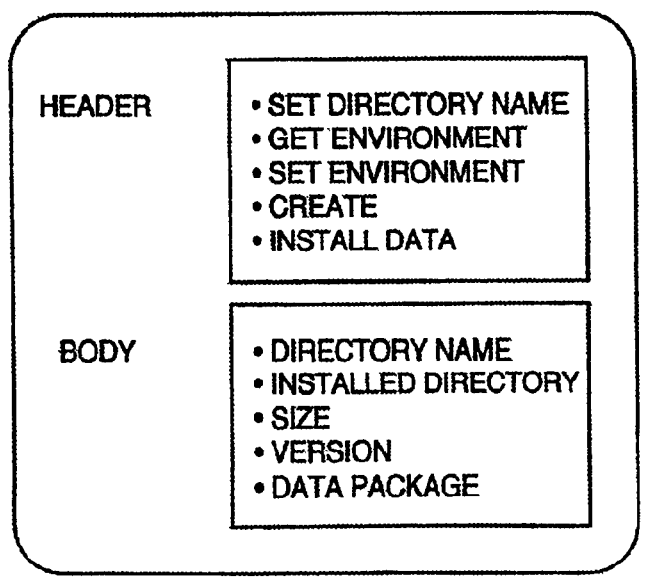
FIG. 2 represents a file transfer tool model being used to build the objects to be transferred from the file system illustrated in FIG. 1.

The principle of the method according to the invention is to build objects based upon the file transfer tool model shown in FIG. 2. Such a model enables one to build a data encapsulation by functions. For this, it is composed of two parts described as follows:

a header, itself divided in five functions listed below:
  a set directory name function, which sets the directory name data;
  a get environment function, which gives the first four body elements (directory name, installed directory, size, and version);

a set environment function, which sets the first four body elements (directory name, installed directory, size, and version);

a create function, which makes the data package and complete body element (installed directory, size, and version); and an install data function, which gives the action required on data package such as uncompress or copy data; and a body, itself divided in five items listed below:

a directory name, which is the root directory of the object component;

an installed directory, which is the parent directory under where the object component will be installed;

a size, which is the real data size;

a version, which is the object versioning; and a data package.

Figure 3:
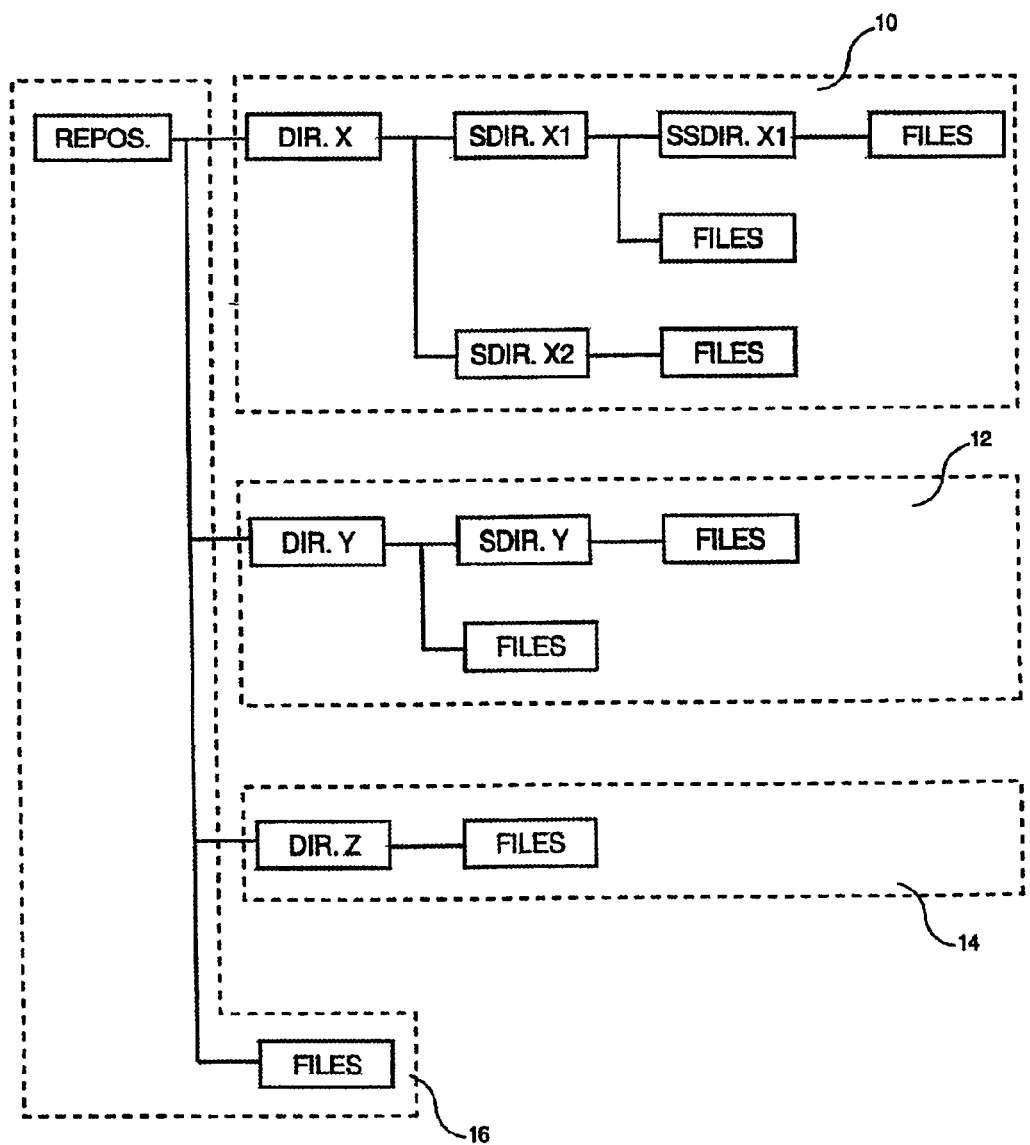
FIG. 3 represents schematically how the file system of FIG. 1 is divided into several objects to be built according to the file transfer tool model illustrated in FIG. 2.

Each object built in the storage of the source data processing unit according to the above model represents each directory just after the root with all subdirectories and the corresponding files. Thus, the file system shown in FIG. 1 will be built into three object components (COMP) 10, 12, and 14 as represented in FIG. 3. Object component 10 includes all files of DIR.X, object component 12 includes all files of DIR.Y and object component 14 includes all files of DIR.Z. When the root REPOS includes itself files, such as is the case for the file system of FIG. 1, a particular object structure (STRUCT) 16 containing the root directory REPOS and the associated files must be built always according to the file transfer tool model shown in FIG. 2. Differently from the other object components, it is just necessary to polymorph the function "create" because only files must be taken into account to build the data package.

While the invention is described by building an object component for each first level of directory only, it must be noted that the same type of object components could be also built for each other level of directory such as SDIR.X or SDIR.Y.

The purpose of building the objects (COMP or STRUCT) is to generate two files, a descriptor file and an archive file in the storage of the source data processing unit, which will be sent from the source data processing unit to the destination data processing unit. For this generation, the functions in the header of the object are defined as follows:

Object Comp

Set Directory Name

Syntax: Obj::Set Directory Name=Value

Object parameters needed: none

Function: Set the data parameter Directory Name to Value in the descriptor file of the object Obj Get Environment Syntax: Parameterlist=Obj::Get Environment Object parameters needed: none Function: Return from descriptor file of object Obj the parameters Directory name, Installed directory, Size, and Version Set Environment Syntax: Obj::Set Environment=Parameterlist Object parameters needed: none Function: Set the data parameters Directory Name, Installed Directory, Size, and Version to Parameterlist in the descriptor file of the object Obj Create Syntax: Obj::Create Object parameters needed: Obj::Directory Name Function:

1. Create the archive file from Obj::Directory Name
2. Evaluate the size of directories and files which are inside the archive file and set object data parameter Obj::Size to this size
3. Set Obj::Installed Directory to the parent directory of Obj::Directory Name
4. Set Obj::Version=(for example current date)

Install Data

Syntax: Obj::Install Data

Object parameters needed: Directory Name, Installed Directory, Size, and Version Function:

1. Go to the directory Obj::Installed Directory
2. Unpackage the directories and files from the archive file
3. Evaluate the size of directories and files which have been unpacked from archive file and compare to Obj::Size Object Struct Set Directory Name Syntax: Obj::Set Directory Name=Value Object parameters needed: none Function: Set the data parameter Directory Name to Value in the descriptor file of the object Obj Get Environment Syntax:

Obj::Get Environment

Object parameters needed: none

Function: Return from descriptor file of object Obj the parameters Directory Name, Installed Directory, Size, and Version Set Environment Syntax: Obj::Set Environment=Parameterlist Object parameters needed: none Function: Set the data parameters Directory Name, Installed Directory, Size, and Version to Parameterlist in the descriptor file of the object Obj Create Syntax: Obj::Create Object parameters needed: Obj::Directory Name Function:

1. Create the archive file from Obj::Directory Name taking only the files
2. Evaluate the size of directories and files which are inside the archive file and set object data parameter Obj::Size to this size
3. Set Obj::Installed Directory to Null
4. Set Obj::Version=(for example current date)

Install Data

Syntax: Obj::Install Data

Figure 4:
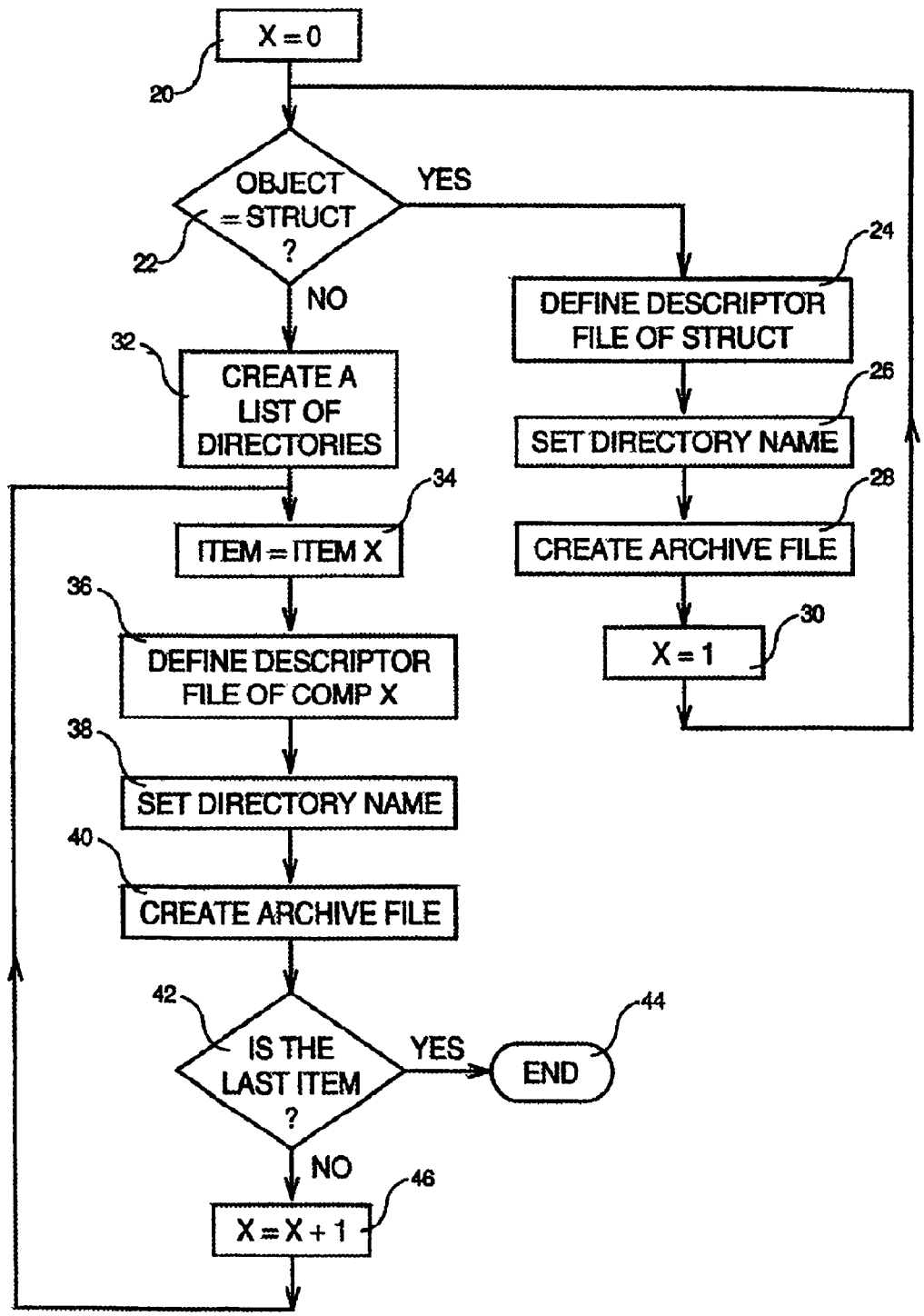
FIG. 4 is a flow chart of the steps which are performed to generate the descriptor file and the archive file to be transferred from the source data processing unit to the destination data processing unit.

Object parameters needed: Directory name, Installed Directory, Size, and Version Function:

1. Go to directory Obj::Installed Directory
2. Unpackage the directories and files from the archive file
3. Evaluate the size of directories and files which have been unpacked from the archive file and compare to Obj::Size Referring to FIG. 4, the steps performed to generate the files to be sent are the following. First of all, a variable X is set to 0 (step 20). It is then determined whether the object is STRUCT or not (step 22). As X=0, the object to be processed is STRUCT. The following step consists in defining the descriptor file of the object STRUCT in memory (Step 24). Then, the directory name is set to the value of the root name REPOS (step 26). The archive file is created and all the remaining parameters of the descriptor file are set (step 28). Finally, variable X is set to 1 (step 30) before coming back to determining that the object to be processed is now COMP 1 since X=1 (step 22).

A list of all directories under the root directory REPOS is first created (step 32). A variable ITEM is set to the indexed element of the list (step 34). The following step consists in defining the descriptor file of the object COMP in memory (step 36). Then, the directory name is set to the value of the item directory (step 38). The archive file associated with the object is then created and the remaining parameters of the descriptor file are set (step 40).

After that, a test is made to check whether the item being processed is the last one of the list (step 42). If so, the process is ended (step 44). If it is not the case, X is set to X+1 (step 46) before returning the process to setting ITEM to the indexed element of the list (step 34).

Figure 5:
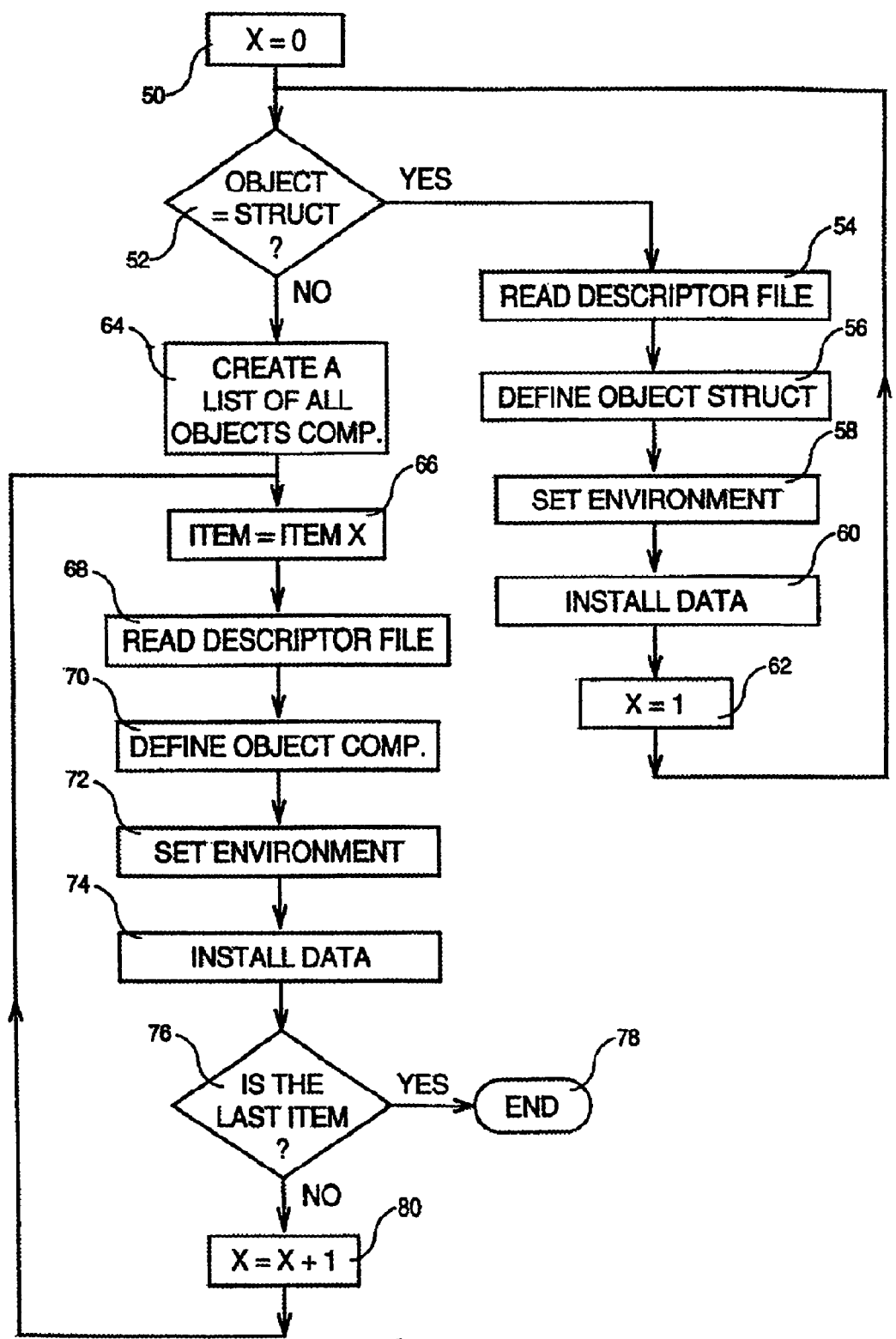
FIG. 5 is a flow chart of the steps which are performed to build the file system in the storage of the destination data processing unit upon receiving the descriptor file and the archive file.

When the descriptor file and the archive file are received by the destination data processing unit, they are stored into the storage of the unit and the algorithm as illustrated in FIG. 5 is performed. First of all, a variable X is set to 0 (step 50). It is then determined whether the received object is of the type STRUCT or not (step 52). As X=0 at the beginning, the object to be processed is STRUCT. The following steps consist in reading the descriptor file of the object (step 54) and then defining the object STRUCT from the information contained in the descriptor file stored in the storage of the destination processing unit (step 56). Then, the environment parameter is set with the value got when reading the received descriptor file (step 58), and the data contained in the archive file is unarchived and installed in the storage (step 60). Finally, variable X is set to 1 (step 62) before the process comes back to determining the object to be processed is now COMP 1 since X=1 (step 52).

A list of all objects of the COMP type is first created (step 64). A variable ITEM is set to the indexed element of the list (step 66). The following steps consist in reading the descriptor file of the object COMP (step 68) and then defining the object in the storage of the destination data processing unit (step 70). Then, the environment parameter is set with the value got when reading the corresponding descriptor file (step 72), and the data contained in the archive file is unarchived and installed into the storage (step 74).

After that, a test is made to check whether the item being processed is the last one of the list (step 76). If so, the process is ended (step 78). If it is not the case, variable X is set to X+1 (step 80) before returning the process to setting ITEM to the indexed element X of the list.

The method described here above applies to all structures composed of folders and files such as the file systems for the e-business software distribution used for Windows platform code. Such a method enables one to reduce the number of elements to be transmitted and therefore increases the knowledge of the application contents. It also reduces the verification process, improves the delivery reliability, and enables one to update easily the structure already installed.

What is claimed is:

1. An object-oriented method for transferring a file system including folders and data files from a source data storage controlled by a source data processing unit to a destination data storage controlled by a destination data processing unit over a transfer medium, said method comprising the steps of:

building in said source data storage at least one file object containing a data package to be transferred;

generating a descriptor file including parameters associated with said file object;

generating an archive file including said data package; and transmitting said descriptor file and said archive file from said source data processing unit to said destination data processing unit over said transfer medium.

2. An object-oriented method according to claim 1, wherein said file object is built by using a file transfer tool model including:

a header containing the following functions: set directory name, get environment, set environment, create, and install data; and a body containing the following items: directory name, installed directory, size, version, and data package.

3. An object-oriented method according to claim 1, wherein said file object is a component object corresponding to files which are associated with a directory.

4. An object-oriented method according to claim 1, wherein said file object is an object corresponding to files which are associated with a root directory.

5. An object-oriented method according to claim 1, wherein the steps of generating said descriptor file and generating said archive file comprise the steps of:

defining the descriptor file in said source data storage;

setting a directory name in said descriptor file;

creating said archive file from the data package; and setting remaining parameters in said descriptor file.

6. An object-oriented method according to claim 5, wherein said remaining parameters comprise installed directory, size, and version.

7. An object-oriented method according to claim 1, further comprising the steps of:

reading a received descriptor file;

defining a file object from information contained in said descriptor file;

setting an environment parameter of said file object with a value got from said descriptor file; and unarchiving data associated with said file object contained in a received archive file and installing said data in said destination data storage.

8. An object-oriented method for receiving in a destination storage controlled by a destination data processing unit a file system which is transferred from a source data storage controlled by a source data processing unit, comprising the steps of:

reading a received descriptor file;

defining a file object from information contained in said descriptor file;

setting an environment parameter of said file object with a value got from said descriptor file; and unarchiving data associated with said file object contained in a received archive file and installing said data in said destination data storage.

9. An object-oriented system for transferring a file system including folders and data files from a source data storage controlled by a source data processing unit to a destination data storage controlled by a destination data processing unit over a transfer medium, said system comprising:

means for building in said source data storage at least one file object containing a data package to be transferred;

means for generating a descriptor file including parameters associated with said file object;

means for generating an archive file including said data package; and means for transmitting said descriptor file and said archive file from said source data processing unit to said destination data processing unit over said transfer medium.

10. An object-oriented system according to claim 9, further comprising:

means for reading a received descriptor file;

means for defining a file object from information contained in said descriptor file;

means for setting an environment parameter of said file object with a value got from said descriptor file; and means for unarchiving data associated with said file object contained in a received archive file and installing said data in said destination data storage.

11. An object-oriented system for receiving in a destination storage controlled by a destination data processing unit a file system which is transferred from a source data storage controlled by a source data processing unit, comprising:

means for reading a received descriptor file;

means for defining a file object from information contained in said descriptor file;

means for setting an environment parameter of said file object with a value got from said descriptor file; and means for unarchiving data associated with said file object contained in a received archive file and installing said data in said destination data storage.

12. A program storage device readable by a machine, tangibly embodying a program of instructions executable by the machine to perform object-oriented method steps for transferring a file system including folders and data files from a source data storage controlled by a source data processing unit to a destination data storage controlled by a destination data processing unit over a transfer medium, said method steps comprising building in said source data storage at least one file object containing a data package to be transferred;

generating a descriptor file including parameters associated with said file object;

generating an archive file including said data package; and transmitting said descriptor file and said archive file from said source data processing unit to said destination data processing unit over said transfer medium.

13. A program storage device to claim 12, said method steps further comprising:

reading a received descriptor file;

defining a file object from information contained in said descriptor file;

setting an environment parameter of said file object with a value got from said descriptor file; and unarchiving data associated with said file object contained in a received archive file and installing said data in said destination data storage.

14. A program storage device readable by a machine, tangibly embodying a program of instructions executable by the machine to perform object-oriented method steps for receiving in a destination storage controlled by a destination data processing unit a file system which is transferred from a source data storage controlled by a source data processing unit, said method steps comprising reading a received descriptor file;

defining a file object from information contained in said descriptor file;

setting an environment parameter of said file object with a value got from said descriptor file; and unarchiving data associated with said file object contained in a received archive file and installing said data in said destination data storage.

* * * * *